US010515361B2

(12) United States Patent
Zarakas et al.

(10) Patent No.: US 10,515,361 B2
(45) Date of Patent: Dec. 24, 2019

(54) SMART CARD SECURE ONLINE CHECKOUT

(71) Applicant: Capital One Services, LLC, McLean, VA (US)

(72) Inventors: James Zarakas, Centerville, VA (US);
Mohamed Firoze Lafeer, Fairfax, VA (US); Molly Johnson, Alexandria, VA (US); Saleem Sangi, Ellicott City, MD (US); Kevin Kelly, Austin, TX (US); Adam Koeppel, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/708,619

(22) Filed: Sep. 19, 2017

(65) Prior Publication Data

US 2018/0181956 A1 Jun. 28, 2018

Related U.S. Application Data

(60) Provisional application No. 62/439,594, filed on Dec. 28, 2016.

(51) Int. Cl.
*G06Q 20/00* (2012.01)
*G06Q 20/38* (2012.01)
(Continued)

(52) U.S. Cl.
CPC ....... *G06Q 20/3829* (2013.01); *G06Q 20/325* (2013.01); *G06Q 20/327* (2013.01);
(Continued)

(58) Field of Classification Search
CPC ................................................ G06Q 20/3829
See application file for complete search history.

(56) References Cited

U.S. PATENT DOCUMENTS 9,516,010 B1 12/2016 Avital et al.
9,760,921 B2 * 9/2017 Roubal .............. G06Q 30/0603
(Continued)

OTHER PUBLICATIONS

"iOS Security Contents", Oct. 1, 2014, XP055145007, Retrieved from the Internet: URL:http://images.apple.com/privacy/docs/iOS_Security_Guide_Oct_2014.pdf [retrieved on Jun. 24, 2016]; pp. 24-29.

(Continued)

*Primary Examiner* — Mamon Obeid
*Assistant Examiner* — John Winter
(74) *Attorney, Agent, or Firm* — Troutman Sanders LLP; Christopher J. Forstner; John A. Morrisett

(57) ABSTRACT

Wireless communication technologies, a dynamic transaction card, and a mobile application may be utilized to facilitate multi-factor authentication and secure electronic checkout of any website. A wireless connection between a dynamic transaction card and a user device may be utilized to authenticate a user. A user device application may be triggered to call, via an application programming interface (API), an account provider system, and this unique pairing may automatically facilitate payment to a merchant system associated with the electronic check out page. The account provider system may send a push notification to a browser extension associated with the checkout page to prompt the browser extension to populate fields on the electronic checkout page using user account information transmitted from the account provider system, providing a novel digital authentication framework that utilizes digital authentication techniques enables by user devices and dynamic transaction cards to seamlessly facilitate electronic checkout.

15 Claims, 6 Drawing Sheets

(51) Int. Cl.
*G06Q 20/32* (2012.01)
*G06Q 20/34* (2012.01)
*G06Q 20/40* (2012.01)
*G06F 16/951* (2019.01)

(52) U.S. Cl.
CPC ....... *G06Q 20/3278* (2013.01); *G06Q 20/341* (2013.01); *G06Q 20/401* (2013.01); *G06F 16/951* (2019.01)

(56) References Cited

U.S. PATENT DOCUMENTS

| | | | |
|---|---|---|---|
| 2002/0073041 A1* | 6/2002 | Kumhyr | G06Q 20/382 705/64 |
| 2013/0228616 A1* | 9/2013 | Bhosle | G06Q 20/227 235/375 |
| 2013/0346314 A1 | 12/2013 | Mogollon et al. | |
| 2016/0027002 A1* | 1/2016 | Choi | G06Q 20/367 705/41 |
| 2016/0189121 A1* | 6/2016 | Best | G06Q 20/405 705/40 |
| 2016/0300231 A1* | 10/2016 | Shavell | G06Q 20/4016 |
| 2016/0309323 A1 | 10/2016 | Zarakas et al. | |
| 2016/0335625 A1 | 11/2016 | Ko et al. | |

OTHER PUBLICATIONS

Extended European Search Report for corresponding Application No. 17210984 dated Apr. 5, 2018.

* cited by examiner

SMART CARD SECURE ONLINE CHECKOUT

CROSS REFERENCE TO RELATED APPLICATION

The subject application claims the benefit of U.S. Provisional Patent Application No. 62/439,594, filed on Dec. 28, 2016, the contents of which are hereby incorporated by reference in their entireties.

FIELD OF THE DISCLOSURE

The present disclosure relates to a dynamic transaction card, and systems and methods relating to the dynamic transaction card. A secure method of facilitating multi-factor authentication and secure electronic checkout of any website utilizes wireless communication technologies, a dynamic transaction card, and a mobile application.

BACKGROUND OF THE DISCLOSURE

Online shopping poses great security concerns. Completing an online shopping transaction requires accessing and transmitting substantial sensitive customer information between customers and merchants. Current malware and phishing attacks attempt to and on occasion succeed in accessing this sensitive account information, causing significant financial harm to customers, merchants, and financial institutions.

Also, using existing systems, customers need to manually provide customer and payment information to complete online shopping transactions. Additionally, a user may need to log in to a browser extension for each transaction. Not only is this burdensome and time-consuming for customers, but it also leads to the possibility of a failed transfer due to the entering of incorrect customer information, which is a likely occurrence when such information is entered manually. As such, there is a need for a faster, easier and more secure online payment checkout process.

These and other drawbacks exist.

SUMMARY OF THE DISCLOSURE

Various embodiments of the present disclosure provide a dynamic transaction card, systems supporting a dynamic transaction card, and methods for operating a dynamic transaction card. Specifically, wireless communication technologies in combination with a mobile application and a dynamic transaction card are utilized to pair a mobile application and a dynamic transaction card to facilitate multi-factor authentication and secure electronic checkout of any website.

As referred to herein, a dynamic transaction card may be understood to be a transaction card that may include a number of accounts that may be activated and/or deactivated by an account holder and/or account provider, data storage that may be updated to reflect real-time and/or on-demand account and/or transaction data, and/or display components to display the updated account and/or transaction data. A dynamic transaction card may be understood to be activated (e.g., turned on) and/or deactivated (e.g., turned off) based on input received at the dynamic transaction card as described herein.

A dynamic transaction card may be a smart card, which may be utilized to facilitate a secure electronic checkout. The dynamic transaction card may include a secure memory chip, a microprocessor, and an application processor that may store a dynamic transaction card application. The dynamic transaction card application when executed may cause the dynamic transaction card to receive, via a short range wireless communication network, which may be a Bluetooth or Bluetooth Low Energy (BLE) network, a connection attempt, from a user device application executed on a user device, and to create a short range wireless communication connection, which may be a Bluetooth or BLE connection, between the dynamic transaction card and the user device. Upon authentication of the user based on evaluation of the connection between the dynamic transaction card and the user device, log in credentials of the user wherein the user has logged in to a browser extension associated with an electronic checkout page, and user information stored in a digital security delivery storage, the user device application may be triggered to call, via an application programming interface (API) coupled to a communication interface that communicates with the dynamic transaction card and user device via a network, an account provider system.

As such, this unique pairing of the dynamic transaction card and user application may automatically facilitate payment to a merchant system associated with the electronic check out page. Upon triggering the user device application to call the account provider system, the account provider system may send a push notification to the browser extension to prompt the browser extension to populate fields on the electronic checkout page using user account information transmitted from the account provider system. Thus the dynamic transaction card, systems supporting the dynamic transaction card, and methods for operating the dynamic transaction card described herein provide a novel digital authentication framework that utilizes digital authentication techniques enables by user devices and dynamic transaction cards to seamlessly facilitate electronic checkout.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

Figure 1:
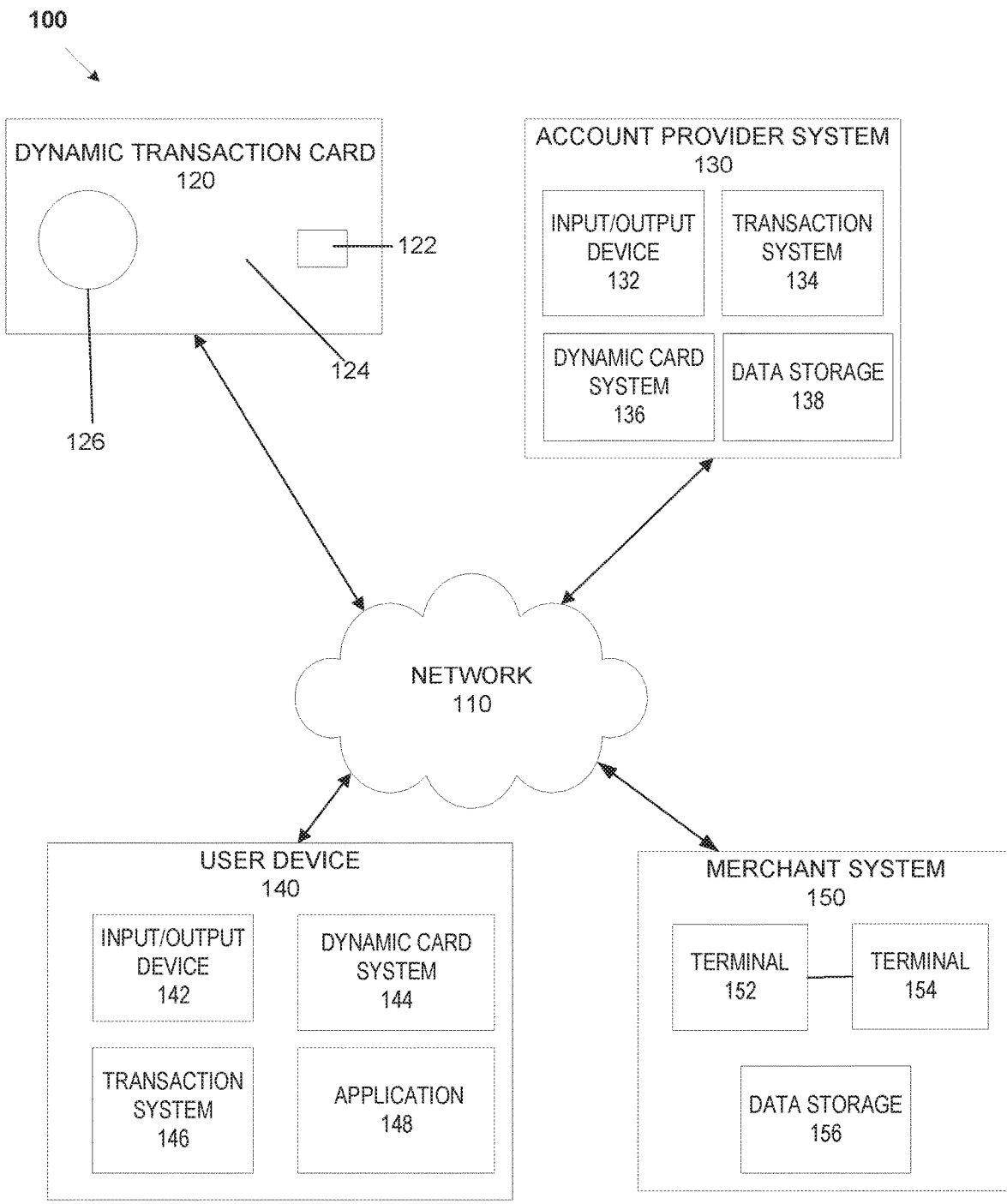
FIG. 1 depicts an example embodiment of a system including a dynamic transaction card according to embodiments of the disclosure.

The entire contents of the following applications are incorporated herein by reference: U.S. Patent Publication No. 2016-0307189, entitled "System, Method and Apparatus for a Dynamic Transaction Card" filed Apr. 14, 2016, which claims the benefit of U.S. Provisional Application No. 62/147,568 filed Apr. 14, 2015 and U.S. Provisional Application No. 62/720,669 filed Dec. 22, 2015; U.S. Patent Publication No. 2016-0307089, entitled "System, Method, and Apparatus for a Dynamic Transaction Card" filed Apr. 14, 2016, which claims the benefit of U.S. Provisional Application No. 62/270,669 filed Dec. 22, 2015 and U.S. Provisional Application No. 62/147,568 filed Apr. 14, 2015; U.S. Patent Publication No. 2016-0308371 entitled "Dynamic Transaction Card Power Management" filed Apr. 14, 2016, which claims the benefit of U.S. Provisional Application No. 62/147,568 filed Apr. 14, 2015, U.S. Provisional Application No. 62/266,324 filed Dec. 11, 2015, U.S. Provisional Application No. 62/270,307 filed Dec. 21, 2015, and U.S. Provisional Application No. 62/305,599 filed Mar. 9, 2016; U.S. Patent Publication No. 2016-0189143, entitled "A System, Method, and Apparatus for Locating a Bluetooth Enabled Transaction Card, filed Dec. 22, 2015, which claims the benefit of U.S. Provisional Application No. 62/095,190, filed on Dec. 22, 2014; U.S. Pat. No. 9,105,025, entitled, Enhanced Near Field Communications Attachment filed on May 29, 2014, which claims the benefit of U.S. Provisional Application No. 61/570,275 filed on Dec. 13, 2011 and U.S. Provisional Application No. 61/547,910 filed on Oct. 17, 2011; U.S. Patent Publication No. 2015-0032635, entitled "System and Method for Exchanging Data with Smart Cards" filed Jul. 23, 2014, which claims the benefit of U.S. Provisional Application No. 61/857,443 filed on Jul. 23, 2013; U.S. Patent Publication No. 2016-0307081, entitled "Dynamic Transaction Card with EMV Interface and Method of Manufacturing" filed Apr. 14, 2016, which claims the benefit of U.S. Provisional Application No. 62/270,648 filed Dec. 22, 2015 and U.S. Provisional Application No. 62/147,568 filed Apr. 14, 2015; U.S. Patent Publication No. 2014-0279231, entitled "System and Method for Providing Third Party Payments with Non-Integrated Merchants" filed Mar. 12, 2014, which claims the benefit of U.S. Provisional Application No. 61/778,776 filed Mar. 13, 2015; U.S. Patent Publication No. 2015-0094026, entitled "System and Method for Automatically Authenticating a Caller" filed Sep. 9, 2014, which claims the benefit of U.S. Provisional Application No. 61/875,251 filed Sep. 9, 2013; U.S. patent application Ser. No. 15/297,453 entitled "System and Method for Automatically Authenticating a Caller" filed Oct. 19, 2016, which is a continuation and claims the benefit of U.S. Patent Publication No. 2015-0094026, which claims the benefit of U.S. Provisional Application No. 61/875,251; U.S. Patent Publication No. 2016-0078430, entitled "System and Method for Digital Authentication" filed Aug. 17, 2015, which claims the benefit of U.S. Provisional Application No. 62/037,710 filed Aug. 15, 2014; U.S. Patent Publication No. 2014-0108260, entitled "System and Method for Token-Based Payments" filed Dec. 18, 2013, which claims the benefit of U.S. Provisional Application No. 61/738,595 filed Dec. 18, 2013; and U.S. Pat. No. 9,183,490, entitled "System and Method for Providing Contactless Payment with a Near Field Communications Attachment" filed Apr. 6, 2012, which claims the benefit of U.S. Provisional Application No. 61/570,275 filed Dec. 13, 2011, which claims the benefit of U.S. Provisional Application No. 61/547,910 filed Oct. 17, 2011.

The following description is intended to convey a thorough understanding of the embodiments described by providing a number of specific example embodiments and details involving a dynamic transaction card and systems and methods for using a dynamic transaction card to utilize wireless communication technologies, a dynamic transaction card, and a mobile application to facilitate multi-factor authentication and secure electronic checkout of any website.

It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. An EuroPay-MasterCard-Visa (EMV) card is used as an example of a dynamic transaction card. A dynamic transaction card may be any type of transaction card that includes a microcontroller-enabled card used in any type of transaction, including, for example, debit cards, credit cards, pre-paid cards, cards used in transportation systems, membership programs, loyalty programs, hotel systems, and the like. A dynamic transaction card may include enhanced features, including hardware, software, and firmware, beyond the traditional features of a magnetic stripe or EMV card. The use of "mobile device" in the examples throughout this application is only by way of example. Any type of device capable of communicating with a dynamic transaction card may also be used, including, for example, personal computers, tablets, gaming systems, televisions, or any other device capable of communicating with a dynamic transaction card.

According to the various embodiments of the present disclosure, a dynamic transaction card and systems and methods for using a dynamic transaction card are provided. Such embodiments may include, for example, a transaction card including various components to facilitate the notifications, alerts, and/or other output on a dynamic transaction card to an account holder associated with the dynamic transaction card. Notifications, alerts, and output may be provided in the form of LED lights and/or colors, LED lighting patterns, dot matrix displays, and/or the like, which as situated on and/or within a dynamic transaction card. Interactive elements of a dynamic transaction card may be activated, triggered, and/or made available via an input component on the dynamic transaction card. For example, a dynamic transaction card may include a capacitive touch sensor, a piezoelectric sensor, via load cells, and/or the like. These types of sensors may activate, trigger, and/or make available display and/or LED lighting information to alert and/or notify a dynamic transaction card holder.

In various embodiments, providing the alerts, notifications, and/or other output on a dynamic transaction card could be provided with the assistance of a network environment, such as a cellular or Internet network. For example, a mobile device may request and/or receive data indicative of notifications, alerts, and/or output to be displayed on a dynamic transaction card from a financial institution system via a network. A mobile device may then relay the data via a network (e.g., a short range wireless network, NFC, Bluetooth, and/or the like) to the dynamic transaction card for storage and/or to activate, trigger, and/or output notifications and/or alerts.

FIG. 1 depicts an example system 100 including a dynamic transaction card, which may utilize a wireless connection in combination with a mobile application to facilitate a secure electronic checkout. As shown in FIG. 1, an example system 100 may include one or more dynamic transaction cards 120, one or more account provider systems 130, one or more user devices 140, and one or more merchant systems.

For example, network 110 may be one or more of a wireless network, a wired network or any combination of wireless network and wired network. For example, network 110 may be one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, a Bluetooth network, or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), a wireless personal area network ("WPAN"), or a global network such as the Internet. Also network 110 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

User device 140 may be, for example, one or more mobile devices, such as, for example, personal digital assistants (PDA), tablet computers and/or electronic readers (e.g., iPad, Kindle Fire, Playbook, Touchpad, etc.), wearable devices (e.g., Google Glass), telephony devices, smartphones, cameras, music playing devices (e.g., iPod, etc.), televisions, set-top-box devices, and the like.

Account provider system 130, user device 140, and merchant system 150 also may include a network-enabled computer system and/or device. As referred to herein, a network-enabled computer system and/or device may be, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. For example, account provider system may include components such as those illustrated in FIG. 2 and/or FIG. 4.

Account provider system 130, user device 140, and merchant system 150 may include at least one central processing unit (CPU), which may be configured to execute computer program instructions to perform various processes and methods. Account provider system 130 and user device 140, may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include an all flash array, a hybrid array, or a server-side product, enterprise storage, which may include online or cloud storage, or any other storage mechanism.

Account provider system 130, user device 140, and merchant system 150 may further include, for example, a processor, which may be several processors, a single processor, or a single device having multiple processors. Although depicted as single elements, it should be appreciated that according to one or more embodiments, account provider system 130 and/or user device 140, may comprise a plurality of account provider systems 130 and/or user devices.

Account provider system 130, user device 140, and merchant system 150 may further include data storage, such as data storage 138, 156. The data storage may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include an all flash array, a hybrid array, or a server-side product, enterprise storage, which may include online or cloud storage or any other storage mechanism.

As shown in FIG. 1, each account provider system 130, user device 140, and/or merchant system 150 may include various components. As used herein, the term "component" may be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component. Further, the components may be implemented across multiple devices or other components local or remote to one another. Additionally, the components may be moved from one device and added to another device, or may be included in both devices.

As depicted in FIG. 1, system 100 may include dynamic transaction cards 120. A dynamic transaction card may be any transaction card that is able to display alerts, notifications, and/or other output to a card holder via a display and/or LED lighting 126 and/or receive input to interact with the dynamic transaction card via, for example, a sensor 124. Although FIG. 1 depicts a single sensor, 124, multiple sensors may be included in dynamic transaction card 120. Dynamic transaction card 120 also may be composed of various materials that enable the entire exterior surface of card 120 to act as a sensor. A dynamic transaction card may be able to communicate with, for example, a mobile device using RFID, Bluetooth, NFC, WiFi Direct and/or other related technologies. For example, communications between a dynamic transaction card and a mobile device may include methods, systems, and devices described in U.S. patent application Ser. No. 14/338,423 filed on Jul. 23, 2014, the entire contents of which are incorporated herein by reference.

A dynamic transaction card may be able to communicate with EMV terminals via contact points on the exterior of card 120 such as those positions on an EMV chip 122 located on the dynamic transaction card 120 or an EMV plate on the exterior of card 120 connected to an EMV processor within card 120. For example, contact points position on the exterior of card 120 may be directly connected and adjacent to an EMV processor (e.g., EMV chip 122). In another example, the contact points positions on the exterior of card 120 may be connected to an EMV processor sing a form of wired connection (e.g., electrical wiring, plastic jumpers, and/or the like) such that the EMV processor may be positioned at any location in the interior of card 120 as described in U.S. Provisional Application 62/270,648, the entire contents of which are incorporated herein by reference.

A dynamic transaction card 120 may also include hardware components to provide contactless payments and/or communications. For example, dynamic transaction card 120 may include an output layer, an outer protective layer, potting, application (e.g., a Java Applet), application integration (e.g., Java Applet integration), a secure payment chip 122 one or more sensors, a display, a display driver, firmware, a bootloader, a microcontroller, one or more antenna, an energy storage component, power management, a flexible PCB, a chassis, and/or card backing. A secure payment chip 122 embedded in the dynamic transaction card 120 may include a number of contacts that may be connected and activated using an interface device. A secure payment chip 122 may include an EMV chip.

Account provider system 130 may include systems associated with, for example, a banking service company such as Capital One®, Bank of America®, Citibank®, Wells Fargo®, Sun Trust, various community banks, and the like, as well as a number of other financial institutions such as Visa®, MasterCard®, and American Express® that issue credit and/or debit cards, for example, as transaction cards. Account provider system 130 may include and/or be connected to one or more computer systems and networks to process transactions. Account provider system 130 may include systems associated with financial institutions that issue transaction cards, such as a dynamic transaction card 120, and maintains a contract with cardholders for repayment. In various embodiments, an account provider system 130 may issue credit, debit, and/or stored value cards, for example. Account provider system 130 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.).

Account provider system 130 may include an input/output device 132, a transaction system 134, a dynamic transaction card system 136, and data storage 138. Input/output device 132 may include for example, I/O devices, which may be configured to provide input and/or output to providing party system 130 (e.g., keyboard, mouse, display, speakers, printers, modems, network cards, etc.). Input/output device 132 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of account provider system 130, and a bus that allows communication among the various components of account provider system 130. Input/output device 132 may include a display, which may include for example output devices, such as a printer, display screen (e.g., monitor, television, and the like), speakers, projector, and the like. Although not shown, each account provider system 130 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Transaction system 134 may include various hardware and software components to communicate between a merchant, acquisition system, account provider system, and/or a user device to process a transaction, such as a user purchase. Dynamic transaction card system 136 may include various hardware and software components, such as data storage (not shown) to store data associated with a dynamic transaction card (e.g., card number, account type, account balance, account limits, budget data, recent transactions, pairing data such as time and date of pairing with a mobile device, and the like) and cardholder data (e.g., cardholder name, address, phone number(s), email address, demographic data, and the like). Data storage 138 may store data associated with an account (e.g., card number, account type, account balance, account limits, budget data, recent transactions, pairing data such as time, date, and location of pairing with a mobile device, and the like) and account holder data (e.g., account holder name, address, phone number(s), email address, demographic data, and the like).

A user device 140, may be a mobile device, and may be any device capable of communicating with a transaction card 120 via, for example, short range wireless technology, Bluetooth technology, NFC technology, WiFi Direct technology, and/or the like and execute various functions to transmit and receive account data (e.g., card number, account type, account balance, account limits, budget data, recent transactions, and/or the like) associated with dynamic transaction card 120. For example, user device 140 could be an iPhone, iPod, iPad, and/or Apple Watch from Apple® or any other mobile device running Apple's iOS operating system, any device running Google's Android® operating system, including, for example, smartphones running the Android® operating system and other wearable mobile devices, such as Google Glass or Samsung Galaxy Gear Smartwatch, any device running Microsoft's Windows® Mobile operating system, and/or any other smartphone or like device.

User device 140 may include for example, an input/output device 142, a dynamic card system 144, a transaction system 146, and an application 148. Input/output device 142 may include, for example, a Bluetooth device or chipset with a Bluetooth transceiver, a chip, and an antenna. The transceiver may transmit and receive information via the antenna and an interface. The chip may include a microprocessor that stores and processes information specific to a dynamic transaction device and provides device control functionality. Device control functionality may include connection creation, frequency-hopping sequence selection and timing, power control, security control, polling, packet processing, and the like. The device control functionality and other Bluetooth-related functionality may be supported using a Bluetooth API provided by the platform associated with the user device 140 (e.g., The Android platform, the iOS platform). Using a Bluetooth API, an application stored on a user device 140 (e.g., a banking application, a financial account application, etc.) or the device may be able to scan for other Bluetooth devices (e.g., a dynamic transaction card 120), query the local Bluetooth adapter for paired Bluetooth devices, establish RFCOMM channels, connect to other devices through service discovery, transfer data to and from other devices or a transaction card 120, and manage multiple connections. A Bluetooth API used in the methods, systems, and devices described herein may include an API for Bluetooth Low Energy (BLE) to provide significantly lower power consumption and allow a user device 140 to communicate with BLE devices that have low power requirements, such dynamic transaction card 120.

Input/output device 142 may include for example, I/O devices, which may be configured to provide input and/or output to user device 140 (e.g., keyboard, mouse, display, speakers, printers, modems, network cards, etc.). Input/output device 142 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of user device 140, and a bus that allows communication among the various components of user device 140. Input/output device 142 may include a display, which may include for example output devices, such as a printer, display screen (e.g., monitor, television, and the like), speakers, projector, and the like. Although not shown, each user device 140 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Input/output device 142 may also include an NFC antenna and secure element (SE). The SE may be a hardware chip specially designed to be tamper proof. In one embodiment, the SE may be used for digitally and physically secure storage of sensitive data, including transaction card data, payment data, health records, car key identifiers, etc. The SE may, for example, store information related to a person, customer, financial institution, or other entity. The SE may store information related to a financial account, such as, for example, transaction card data (e.g., a credit card number, debit account number, or other account identifier, account balance, transaction history, account limits, budget data, recent transactions, and/or the like). The SE may include a computer processor or other computational hardware or software. As one example, the secure element may contain the Visa® and MasterCard® applications for PayWave® and PayPass® transactions. A secure element may take the form of a universal integrated circuit card (UICC) and/or a microSD card. A UICC may identify a user to a wireless operator, store contacts, enable secure connections, and add new applications and services, such as a transaction system.

Input/output device 142 may enable Industry Standard NFC Payment Transmission. For example, the input/output device 142 may enable two loop antennas to form an air-core transformer when placed near one another by using magnetic induction. Input/output device 142 may operate at 13.56 MHz or any other acceptable frequency. Also, input/output device 142 may provide for a passive communication mode, where the initiator device provides a carrier field, permitting answers by the target device via modulation of existing fields. Additionally, input/output device 142 also may provide for an active communication mode by allowing alternate field generation by the initiator and target devices.

Input/output device 142 may deactivate the RF field while awaiting data. The attachment may use Miller-type coding with varying modulations, including 100% modulation. The attachment may also use Manchester coding with varying modulations, including a modulation ratio of 10%. Additionally, the attachment may be capable of receiving and transmitting data at the same time, as well as checking for potential collisions when the transmitted signal and received signal frequencies differ.

Input/output device 142 may be capable of utilizing standardized transmission protocols, for example but not by way of limitation, ISO/IEC 14443 A/B, ISO/IEC 18092, MiFare, FeliCa, tag/smartcard emulation, and the like. Also, input/output device 142 may be able to utilize transmission protocols and methods that are developed in the future using other frequencies or modes of transmission. Input/output device 142 may also be backwards-compatible with existing techniques, for example RFID. Also, the system may support transmission requirements to meet new and evolving standards including internet based transmission triggered by NFC.

Dynamic transaction card system 144 may work with input/output device 142 to generate and receive account data associated with a dynamic transaction card 120. For example, dynamic transaction card system may include various hardware and software components such as a processor and data storage to store dynamic transaction card data (e.g., cardholder name, address, phone number(s), email address, demographic data, card number, account type, account balance, account limits, budget data, recent transactions and the like).

Transaction system 146 may include various hardware and software components, such as data storage and a processor that may work with input/output device 142 to communicate between a merchant, acquisition system, account provider system, and/or a mobile device to process a transaction, such as a user purchase.

User device 140 may also include various software components to facilitate the operation of a dynamic transaction card 120. For example, user device 140 may include an operating system such as, for example, the iOS operating system from Apple, the Google Android operating system, and the Windows Mobile operating system from Microsoft.

Mobile device 140 may also include, without limitation, software applications such as mobile banking applications and financial institution application to facilitate use of a dynamic transaction card 120, 150, an NFC application programming interface, and software to enable touch sensitive displays. Mobile banking applications and/or financial institution applications may be combined and/or separate from a dynamic transaction card system 144. Mobile device manufacturers may provide software stacks or Application Programming Interfaces (APIs) which allow software applications to be written on top of the software stacks. For example, mobile device manufacturers may provide, without limitation, a card emulation API to enable NFC card emulation mode, a logic link control protocol (LLCP) API for peer-to-peer communication between mobile devices, a Bluetooth API supporting BLE, and a real-time data (RTD) API and a NFC Data Exchange Format (NDEF) API for reading/writing.

Software applications on user device 140 may include, for example, user application 148, which may be integrated with or separate from a mobile wallet application, which may be utilized to by a customer to facilitate a secure electronic checkout. A user device 120 may communicate with account provider system 130 via mobile application 148.

Software applications on user device 140, such as mobile banking applications and applications associated with a dynamic transaction card 120, may include card on/off features that allow a cardholder associated with a mobile device 140 to enable and disable a transaction card. For example, a card holder may use, for example, a mobile banking application stored on a user device 140 to disable and/or enable accounts associated with a dynamic transaction card 120. A mobile banking application may include, for example, an application as displayed on mobile device 320 in FIG. 3. In this example, a dynamic transaction card 120 may have account data pre-stored on the dynamic transaction card 120 to associate a number of different accounts with the dynamic transaction card (e.g., debit card, credit card, prepaid card, and/or the like). If a card holder has a credit account established and desires to establish a debit card associated with the dynamic transaction card 120, the card holder may use a mobile device 140 and/or dynamic transaction card 120 to activate the inactive debit account on the dynamic transaction card 120.

Dynamic transaction card 120 may include firmware and/or a bootloader. A bootloader may include code to be executed as a dynamic transaction card is activated and before any operating system, firmware, or other code is executed on the dynamic transaction card 120. A bootloader may be activated via a sensor and energy storage component of the dynamic transaction card 120. A bootloader may be activated and/or load an application and/or program upon detection that card 120 has been inserted into a terminal, charger, and/or the like. A bootloader may be activated using only one technique described herein, using multiple techniques described herein, and/or using a card holder or card provider selected technique(s) described herein. A bootloader may only be active during a short interval after the card powers up. Dynamic transaction card 120 may also be activated using program code that may be flashed directly to a microprocessor such as a microcontroller, secure payment processor, EMV processor, and/or the like. Dynamic transaction card 120 may not use a bootloader but instead may cycle between a sleep state and an active state using program code and/or memory.

A dynamic transaction card 120 may include a microcontroller and an antenna. An antenna may include, for example, a loop antenna, a fractal antenna, and/or the like. An antenna may transmit to and receive signals from a mobile device, such as user device 140, to conduct transactions and display data as described throughout the specification. A microcontroller may communicate with an secure payment chip, Java Applet, Java Applet integration, sensor(s), power management, antenna, energy storage component, display, display driver, firmware, bootloader, and/or any other component of dynamic transaction card 120. A microcontroller may control the card operations to conduct transactions and/or display data as described throughout this specification.

Figure 2:
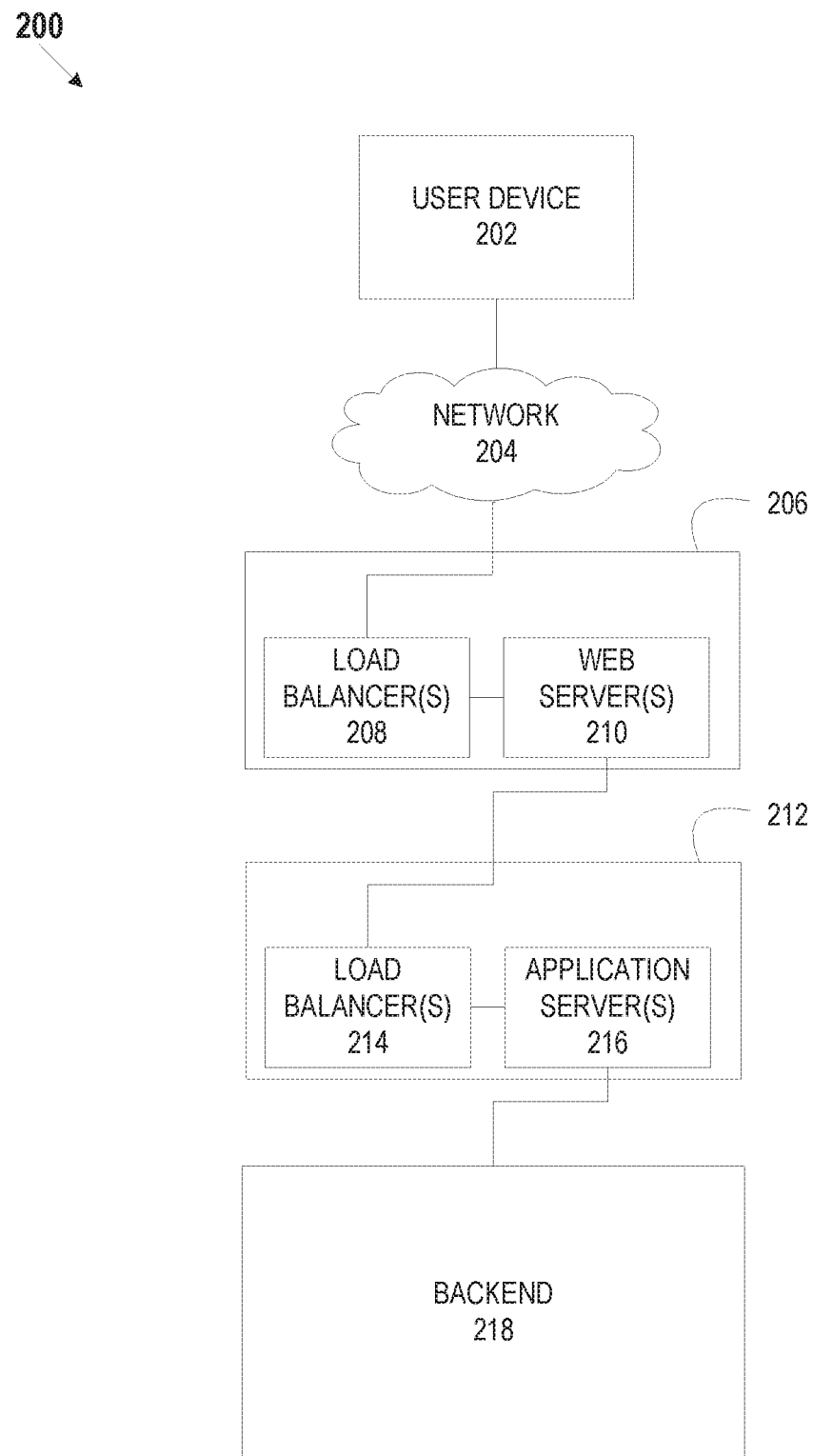
FIG. 2 depicts an example embodiment of a system including dynamic transaction card according to embodiments of the disclosure.
Figure 4:
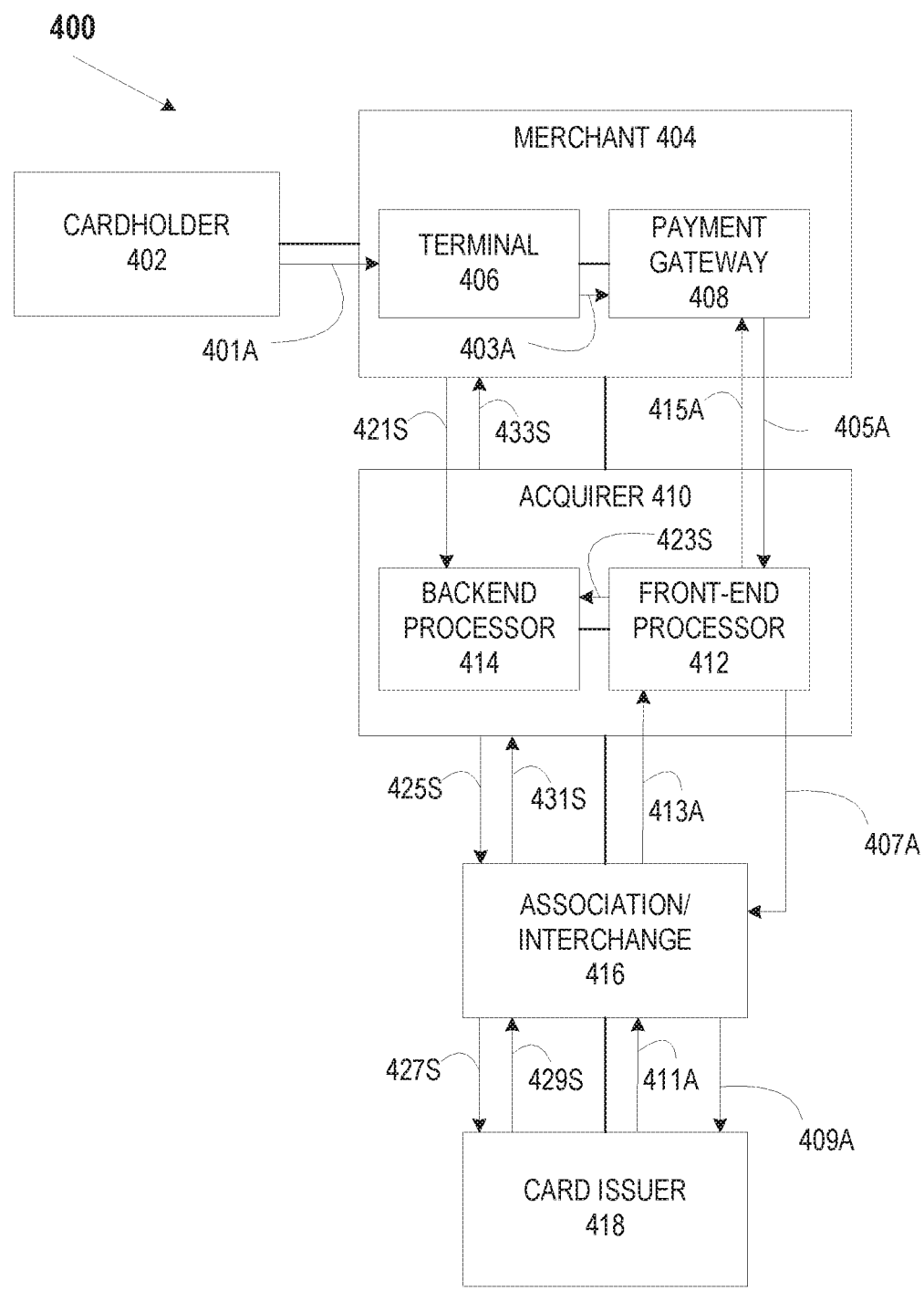
FIG. 4 depicts an example embodiment of a system including a dynamic transaction card according to embodiments of the disclosure.

FIG. 2 illustrates a system associated with the use of a dynamic transaction card. The example system 200 in FIG. 2 may enable a financial institution, for example, to provide network services to its cardholders, and may include providing transaction card data, account data, and/or any other data to a mobile device that may in turn provide that data to a dynamic transaction card. For example, a financial institution may include a front-end controlled domain 206, a back-end controlled domain 212, and a backend 218 as part of account provider system 130, a user device 202 may include user device 140, and a dynamic transaction card may include dynamic transaction card 120. Referring to FIG. 4, for example, a dynamic transaction card may be similar to a dynamic transaction card of cardholder 402; a financial institution may include a front-end controlled domain 406, a back-end controlled domain 412, and a backend 418 as part of card issuer system 418 and/or association/interchange 416; and a mobile device may be similar to a mobile device of cardholder 402.

The example system 200 also may enable a merchant, for example, to provide network services to its customers, and may include providing sales, loyalty account data, and/or any other data to a mobile device that may in turn provide that data to a dynamic transaction card. For example, a mobile device 202 and/or dynamic transaction card may interact with a merchant system, such as merchant system to send and/or receive data to the merchant system, which may interact with a financial institution over a network, where a financial institution may include a front-end controlled domain 206, a back-end controlled domain 212, and a backend 218.

System 200 may include a user device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

User device 202 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

User device 202 may include a mobile device, and may be an iPhone, iPod, iPad from Apple® or any other mobile device running Apple's iOS operating system, a device running Google's Android® operating system, including for example, Google's wearable device, Google Glass, a device running Microsoft's Windows® Mobile operating system, and/or any other smartphone, wearable mobile device, or like mobile device. User device 202 also may be similar to user device 140 as shown and described in FIG. 1.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 204 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 210 may distribute workloads across, for example, web server(s) 216 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software that monitoring the port where external clients, such as, for example, user device 202, connect to access various services of a financial institution, for example. Load balancer(s) 208 may forward requests to one of the application servers 216 and/or backend 218 servers, which may then reply to load balancer 208. This may allow load balancer(s) 208 to reply to mobile device 202 without mobile device 202 ever knowing about the internal separation of functions. It also may prevent mobile devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP/HTTPS compression; TCP offloading; TCP buffering; direct server return; health checking; HTTP/HTTPS caching; content filtering; HTTP/HTTPS security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., user device 202) through a network (e.g., network 204), such as the Internet. In various examples, web servers, may deliver web pages, relating to, for example, online banking applications and the like, to clients (e.g., user device 202). Web server(s) 210 may use, for example, a hypertext transfer protocol (HTTP/HTTPS or sHTTP) to communicate with mobile device 302. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP/HTTPS and web server 210 may respond with the content of that resource or an error message if unable to do so. The resource may be, for example a file on stored on backend 218. Web server(s) 210 also may enable or facilitate receiving content from mobile device 302 so mobile device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution, or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 216 may behaves like an extended virtual machine for running applications, transparently handling connections to databases associated with backend 218 on one side, and, connections to the Web client (e.g., user device 202) on the other.

Backend 218 may include hardware and/or software that enables the backend services of, for example, a financial institution, merchant, or other entity that maintains a distributed system similar to system 200. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and/or a location system, which may include additional capabilities, such as transaction card data generation, transaction processing, and/or transmission of account and/or transaction data. Backend 218 may be associated with various databases, including account databases that maintain, for example, cardholder information (e.g., demographic data, credit data, cardholder profile data, and the like), transaction card databases that maintain transaction card data (e.g., transaction history, account balance, spending limit, budget categories, budget spending, budget limits, and the like), and the like. Backend 218 also may be associated with one or more servers that enable the various services provided by system 200. Backend 218 may enable a financial institution to implement various functions associated with reprogramming a transaction card and/or providing data to a transaction card in order to provide a dynamic display as shown and described herein.

A dynamic display may be a display that is altered by activating new card data such as, a new card number, a new security code (e.g., CCV code), a new expiration date, and/or other card/account data. A dynamic display may be a display that is altered by activating new account data, such as a new account number, a new card number, a new security code, a new expiration date, and/or other card/account data. New account and/or new card data may be fully pre-loaded, partially pre-loaded, and/or received from a wireless connection.

For example, fully pre-loaded data may include a full account number, card number, security code, expiration date, and/or other account data that is loaded onto a dynamic transaction card (e.g., dynamic transaction card 120) upon personalization at a backend facility. Fully pre-loaded data may also include an associated applet that interacts with the account and/or card data to execute transactions, manipulate dynamic displays, and/or perform any of the functionality described herein. Fully pre-loaded data may be activated upon receiving an activation signal from, for example, an account holder device via a wireless connection. A wireless device may receive an activation signal from an issuing financial institution via a network connection using, for example, a mobile application and/or mobile-enhanced website associated with the issuing financial institution.

Partially pre-loaded data may include a shell account that includes a placeholder for each type of data required for a fully-functional account (e.g., account holder data, account number, security code, expiration date, and/or the like). A placeholder may include one or more alphanumeric characters associated with inactive, null, or shell accounts in a backend system associated with the issuing financial institution. Partially pre-loaded data may include an associated applet that interacts with the account and/or card data to execute transactions, manipulate dynamic displays, and/or perform any of the functionality described herein. Partially pre-loaded data may be activated upon receiving an activation signal and/or new card or new account data from, for example, an account holder device via a wireless connection or a contact connection (e.g., using a terminal in contact with an EMV processor and/or other microchip). A wireless device may receive an activation signal and/or new card or new account data from an issuing financial institution via a network connection using, for example, a mobile application and/or mobile-enhanced website associated with the issuing financial institution.

Data transmitted may be encrypted. Encryption/decryption may occur using a key that was preloaded onto the dynamic transaction card upon personalization at the issuing financial institution and/or a key preloaded to an secure payment processing circuit, which may include an EMV circuit. Data received may include new account and/or card data. For example, where partially pre-loaded card and/or account data are stored on a dynamic transaction card, new card and/or account data may be received from an account holder's mobile device via a wireless connection (e.g., BLE, NFC, WiFi, and/or the like) or a contact connection (e.g., using a terminal in contact with an EMV processor and/or other microchip). Data received may include an applet and/or applet data required to execute transactions, manipulate dynamic displays, and/or perform any of the functionality described herein.

Also, fully pre-loaded and/or partially pre-loaded data may also include keys (e.g., public/private key pairs, private key pairs, and/or the like) that may be used by an secure payment processing circuit, which may be an EMV circuit to execute transactions using the secure payment processor on the card, which may be an EMV processor.

Figure 3:
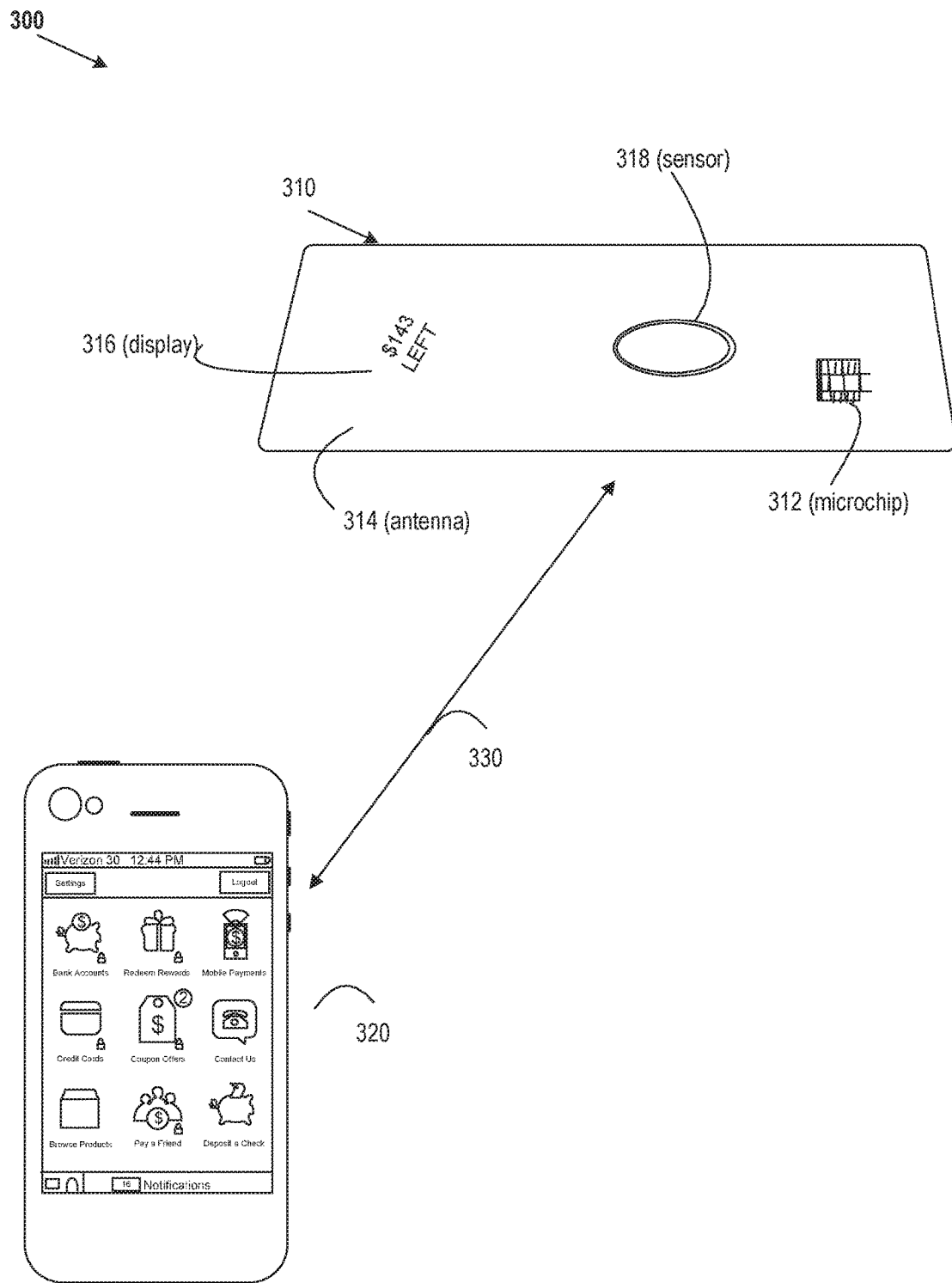
FIG. 3 depicts an example card-device linking system according to embodiments of the disclosure.

FIG. 3 illustrates a system associated with the use of a dynamic transaction card. The example system 300 in FIG. 3 may enable a mobile device 320 storing a mobile banking application, for example, to provide data updates to a dynamic transaction card 310 via network 330. For example, data received at mobile device 320 may be transmitted to dynamic transaction card 310 where it is received via antenna 314. Data may be received and/or transmitted using, for example a mobile banking application that maintains and/or creates a secure connection with a financial institution to send and/or receive data related to an account associated with the financial institution. For example, a mobile banking application may include send and/or receive data related to a credit account, a debit account, a prepaid account, a loyalty account, a rewards account, and/or the like. Data may also include track data that may be updated upon demand.

A dynamic transaction card may be paired with a user device to facilitate secure authentication and secure online checkout. The mobile application located on the user device may notify a backend account provider system and/or data storage associated with the mobile application via an application programming interface (API) call to the backend to facilitate secure checkout for any online shopping website. The mobile application may communicate with a dynamic transaction card via Bluetooth, BLE, and/or NFC, and may communicate with the backend account provider system via mobile networks or WiFi.

Upon activation of dynamic transaction card via, for example, a sensor 318, a data request may be transmitted to a mobile device 320 for updated information, where mobile device 320 may request updated data from a financial institution (not shown). Data received at dynamic transaction card 310 may be stored on microchip 312 and/or may be displayed via display 316.

FIG. 4 illustrates an example system 400 and method for a secure electronic checkout. As shown and described in FIG. 4, account holders, such as account holders associated with a dynamic transaction card similar to dynamic transaction card 120 and/or a mobile device similar to user device 140 and financial institutions similar to account provider system 130 may be connected with a card association network to enable secure transactions, timely payments, and successful withdrawals. System 400 may include a cardholder 402, merchant 404, Acquirer 410, Association/Interchange 416, and card issuer 418.

Cardholder 402 may be any account holder, including a credit card holder, debit card holder, stored value card holder and the like. Cardholder 402 may be similar to the card holder associated with dynamic transaction card 120 and/or user device 140. Cardholder 402 may possess a plastic card or carry a device (e.g., a mobile device) that securely stores card credentials and is capable of transmitting the card credentials to, for example, a PoS terminal (e.g., terminal 406) and/or an input/output device. Cardholder 402 may interact with a merchant and/or a providing party (e.g., merchant 404) by presenting a transaction card (e.g., dynamic transaction card 120) or card credentials to a terminal (e.g., terminal 406).

Merchant 404 may be any merchant that accepts payment from a cardholder 402 in exchange for goods, for example. Merchant 404 may be any retailer, service provider, business entity, or individual that accepts payments. Merchant 404 may include software, firmware and hardware for accepting and/or processing payments. For example, as illustrated in FIG. 4, merchant 404 may include a terminal 406 and a payment gateway 408. Terminal 406 and payment gateway 408 may comprise the physical or virtual device(s) used by merchant 404 to communicate information to front-end processor 412 of acquirer 410. Terminal 406 may be similar to a PoS system. Terminal 406 may include a secure payment processing reader, which may be an EMV card reader to interact with a dynamic transaction card. In various embodiments, payment gateway 408 may be an e-commerce application service provider service that authorizes payments for merchants. As such, payment gateway 408 may be a virtual equivalent of a PoS terminal and interface with, for example, a billing system of merchant 404 and pass data to front-end processor 412 of acquirer 410.

Acquirer 410 may be, for example, a financial institution or bank that holds the contract for providing payment processing services to merchant 404. Merchant 404 may have a merchant account that may serve as a contract under which Acquirer 410 may extend a line of credit to a merchant who wishes to accept, for example, credit card transactions. As shown in FIG. 4, Acquirer 410 may be associated with front-end processor 412 and back-end processor 414.

In various examples, front-end processor 412 may be a platform that card terminal 406 and/or payment gateway 408 communicate with when approving a transaction. Front-end processor 412 may include hardware, firmware, and software to process transactions. Front-end processor 412 may be responsible for the authorization and capture portion of credit card transaction. Front-end processor 412 also may include additional front-end platform interconnections to support, for example, ACH and debit transactions.

Backend processor 414 may be a platform that takes captured transactions from front-end processor 412 and settles them through an Interchange system (e.g., association/interchange 416). Back-end processor 414 may generate, for example, daily ACH files for merchant settlement. Back-end processor 414 also may handle chargeback handling, retrieval request and monthly statements.

Association/interchange 416 may be the consumer payment system whose members are the financial institutions that issue payment cards and/or sign merchant to accept payment cards. Example associations/interchanges 416 may include, Visa®, MasterCard®, and American Express®. Association/interchange 416 may include one or more computer systems and networks to process transactions.

Issuer 418 may be a financial institution that issues payment cards and maintains a contract with cardholders for repayment. In various embodiments, issuer 418 may issue credit, debit, and/or stored value cards, for example. Example issuers may include, Capital One®, Bank of America®, Citibank®, Sun Trust®, and the like.

In various embodiments, processing a payment card transaction may involve two stages: (1) authorization and (2) clearing and settlement. Authorization may refer to an electronic request that is sent through various parties to either approve or decline the transaction. Clearing and Settlement may refer to settlement of the parties' settle accounts to enable the parties to get paid.

During authorization, cardholder 402 may present payment card, such as dynamic transaction card 120, as payment (401A) at merchant 404 PoS terminal 406, for example. Merchant 404 may enter card into a physical PoS terminal 406 (e.g., a secure payment processing terminal or EMV terminal) or submit a credit card transaction to a payment gateway 408 on behalf of withdrawing party 402 via secure connection from a Web site, retail location, or a wireless device.

Payment gateway 408 may receive the secure transaction information (403A) and may pass the secure transaction information (405A) via a secure connection to the merchant acquirer's 410 front-end processor 412.

Front-end processor 412 may submit the transaction (407A) to association/interchange 416 (e.g., a network of financial entities that communicate to manage the processing, clearing and settlement of credit card transactions). Association/interchange 416 may route the transaction (409A) to the customer's Issuer 418. Issuer 418 may approve or decline the transaction and passes the transaction results back (411A) through association/interchange 416. Association/interchange then may relay the transaction results (413A) to front-end processor 412.

Front-end processor 412 may relay the transaction results (415A) back to the payment gateway 408 and/or terminal 406. Payment gateway 408 may store the transaction results and send them to merchant 404. Merchant 404 may receive the authorization response and complete the transaction accordingly.

During settlement, merchant 404 may deposit the transaction receipt (421S) with acquirer 410 via, for example, a settlement batch. Captured authorizations may be passed (923S) from front-end processor 412 to the back-end processor 414 for settlement. Back-end processor may generate ACH files for merchant settlement. Acquirer may submit settlement files (425S, 427S) to Issuer 418 for reimbursement via association/interchange 416. Issuer 418 may post the transaction and/or withdrawal and pay merchant 404 (429S, 431S, 433S).

Figure 5:
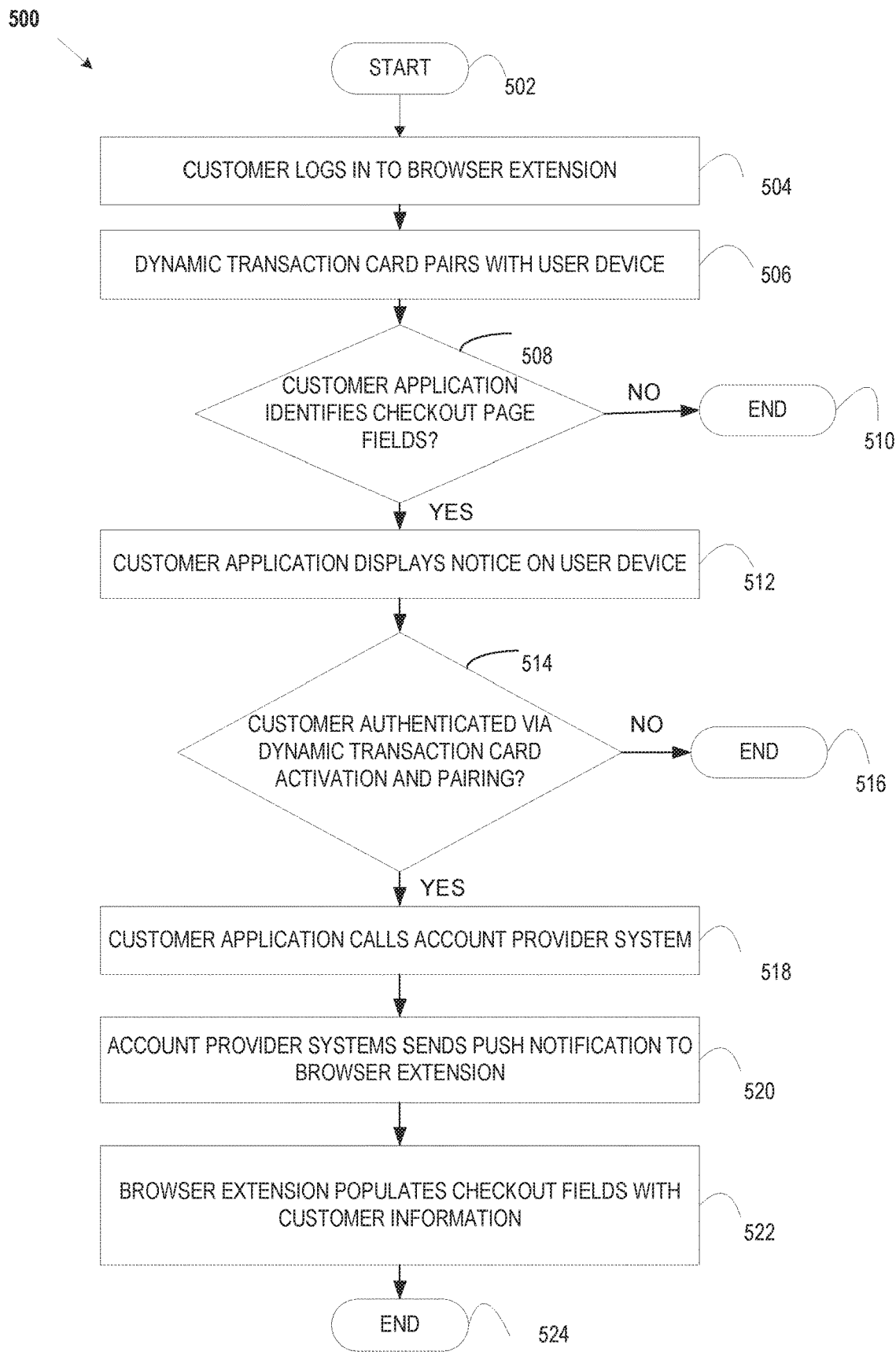
FIG. 5 depicts an example method for using a dynamic transaction card according to embodiments of the disclosure.

FIG. 5 illustrates an example method of utilizing a wireless pairing of a dynamic transaction card and a user device application to facilitate multi-factor authentication and a secure online checkout. The method 500 may start at block 502. At block 504, a customer completing an online shopping transaction may log in to a browser extension associated with an electronic checkout page. A browser extension may include a plug-in that may extend the functionality of the web browser of the merchant online shopping website, which may be utilized to facilitate a secure checkout.

At block 506, the customer's dynamic transaction card may receive via a short range wireless network, which may be a Bluetooth or Bluetooth Low Energy (BLE) network, a connection attempt from a user application associated with the user device utilized for online shopping to pair the dynamic transaction card with the user device. The user application may identify checkout fields on the online shopping site at block 508. For example, a web crawler may be utilized to search for checkout fields, which may be obtained from online shopping web pages, and may be accessed by the web crawler and APIs. The web crawler process may automatically browse a web page, and may identify and index fields on the merchant sites. In an embodiment, a web crawler may be embodied in a script that may parse HTML code of the sites to look for certain checkout field attributes associated with merchant sites. If checkout fields are not identified, the process may end at block 610.

At block 512, if checkout fields are identified, the user application may display a window via a user interface on the user device, which may request the customer to wake up the associated dynamic transaction card to complete payment information. Upon activation of the dynamic transaction card to wake up the card, a wireless connection, which may include a Bluetooth, BLE, or NFC connection may be established between the dynamic transaction card and the user device.

At block 514, the customer may be authenticated by utilizing multi-factor authentication based on the pairing of the dynamic transaction card and the successful log in of the customer to the browser extension. This multi-factor authentication may provide computer access control in which the user is only granted access to complete the secure online checkout after successfully presenting these pieces of evidence to an authentication system. For example, the customer may be authenticated based on evaluation of the connection between the dynamic transaction card and the user device, log in credentials of the customer for logging in to the browser extension associated with the electronic checkout page and user information stored in a digital security database. The dynamic transaction card may communicate directly with the browser extension through a wireless connection, which may include Bluetooth or BLE. For example a user device, which may include Bluetooth or BLE may be utilized to facilitate this direct communication.

The customer may also be authenticated based on the log in credentials associated with logging in to the user application on the user device. The introduction of the user device and dynamic transaction card may provide immutable hardware identifiers, processors for encryption and location awareness, as well as new interactions via touch, microphone, camera, Bluetooth, BLE, and/or NFC, as the user device and dynamic transaction card are something customers have with them. The user device and dynamic transaction card may also enable transmission of data about customers and data indicative of things customers know. The digital security database may store information about a user that is enrolled in push notification authentication, including identifying characteristics of the dynamic transaction card, the user device and login information for the user for the browser extension associated with the checkout page. Thus, systems and methods for authentication described herein provide a novel digital authentication framework that utilizes digital authentication techniques enabled by user devices and dynamic transaction cards.

In various example embodiments, push notification authentication may be used to securely allow a customer to approve a purchase where a card is not present at the merchant location (e.g., a "card not present" transaction). For example, when shopping online, customers must enter account number, expiry date and security code to complete a purchase. This manner of providing payment information has drawbacks because this information may already be known to fraudsters and can be exploited and the merchant is now in possession of this information and the user's information could be exposed/vulnerable should the merchant be compromised by hackers. According to various embodiments, a customer may make a purchase online using their account number and expiry date only. The customer may request that the merchant authenticate using push notification authentication. The account provider system may identify the user's identification and their registered device, which may include the user device and/or dynamic transaction card. The account provider system may also identify the user's login and the user's registered device. The account provider system servers may transmit a push notification to the user device and dynamic transaction card combination for the account. The customer may receive, for example, a slide up advising them of what transaction is requiring additional approval (i.e., a card not present transaction is being attempted). The customer then may authenticate via the appropriate transaction level, swipe, password/touchID/pattern recognition or facial recognition and the customer application on the user device may transmit the customer's response—approve or deny—back to the card issuers server. If the customer receives this push notification, the customer may authenticate via the mobile device and/or dynamic transaction card as shown and described herein. As such, this push notification system may allow a user to login to a website without having to provide username and password credentials. The account provider system then may inform the website that the customer has authenticated and the card not present transaction can proceed.

An application processor on the dynamic transaction card may also be utilized to generate a unique key, which may include a token, which may be utilized to securely store customer account information, which in turn may be utilized to authenticate the customer. As such, sensitive customer account information does not need to be entered to facilitate the funds transfer and may be obtained through the wireless connection. The unique key may be associated with the browser extension and may include a single-use transaction key.

If the authentication fails, the process may end at block 516. Upon authentication of a customer based on the evaluation of the connection between the dynamic transaction card and the user device, log in credentials of the user for logging in to the browser extension associated with the checkout page, and user information stored in the digital security delivery storage, the dynamic transaction card application may trigger the user device application to call an account provider system, via and API coupled to a communication interface that communicates with the dynamic transaction card and user device via a network at block 518. In response, at block 520, the account provider system may send a push notification to the browser extension. The account provider system may transmit the customer account information to the customer application, via a short range wireless communication network, which may be a Bluetooth or BLE network, which at block 522, may prompt the browser extension to populate the fields on the electronic checkout page using the user account information retrieved and transmitted by the account provider system through the customer application, by utilizing a processor configured to intercept the user account information, to automatically facilitate payment to the merchant system. The customer account information may be passed and queued on the backend merchant system to complete the checkout transaction. The process may end at block 524.

The request to facilitate a secure electronic checkout may be processed using the systems described in FIGS. 1, 2, 3, and 4. Data may be securely transmitted between a customer device, a dynamic transaction card, a financial institution, and a merchant. Moreover, a mobile banking application and/or a financial institution application may provide a secure connection and/or security features (e.g., cryptographic keys, protocol, hash algorithm, digital signatures, passwords, checksums, and/or the like) to conduct secure communications with a financial institution and merchant backend and receive updated financial data to transmit, via RFID, BLE, Bluetooth, NFC, and/or the like, to a dynamic transaction card for storage and/or display.

For example, a mobile application may communicate with a backend account provider and/or merchant system via a mobile network or WiFi to pass customer/account information to the backend to facilitate the secure checkout transaction. Customer account information may be encrypted to facilitate a secure transfer of the information. The transmitted information may include a key or token of encrypted information representing a financial account, the amount of the transaction and/or other information necessary to facilitate the transfer of funds. The backend account provider system may verify the customer account information, as it may use the customer account information to look up the account of the customer and determine whether the transaction should be authorized. The account provider system may check the account information against certain parameters to determine, for example, whether the transfer complies with certain parameters, and/or whether the associated token has expired.

An API may also encrypt, for example account and routing numbers to ensure that any passing customer account identifying data is secure during transmission and storage. The data may be read and encrypted using a private key stored within the dynamic transaction card processor. first device also may store instructions to encrypt and/or encode data being transmitted from the first device. A first device may store instructions to decrypt and/or decode data received at the first device. A first device may store encryption/encoding/decryption/decoding instruction in a secure element or a secure microprocessor. For example, where a first device includes a secure payment chip, which may be an EMV chip, encryptions/encoding/decryption/decoding instructions may be stored within the secure payment chip. A first device may store instructions to validate a public/private key handshake between the first device and a second device to pair the first device and second device via a Bluetooth/BLE connection.

Figure 6:
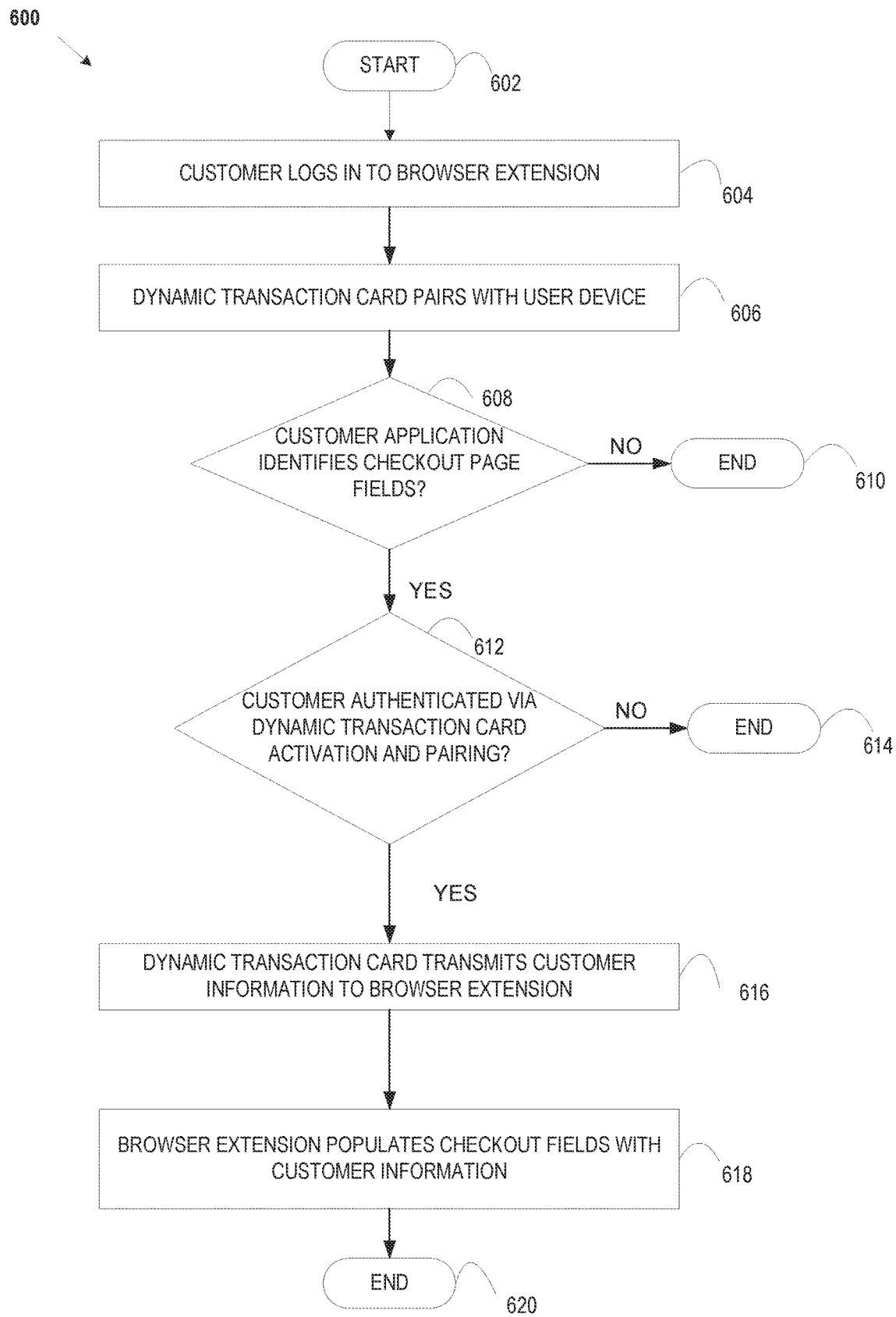
FIG. 6 depicts an example method for using a dynamic transaction card according to embodiments of the disclosure.

FIG. 6 also illustrates an example method of utilizing a wireless pairing of a dynamic transaction card to facilitate multi-factor authentication and a secure online checkout. The method 600 may start at block 602. At block 604, a customer completing an online shopping transaction may log in to a browser extension associated with an electronic checkout page. A browser extension may include a plug-in that may extend the functionality of the web browser of the merchant online shopping website, which may be utilized to facilitate secure checkout.

At block 606, the customer's dynamic transaction card may receive via a Bluetooth or Bluetooth Low Energy (BLE) network, a connection attempt from a user application associated with the user device utilized for online shopping to pair the dynamic transaction card with the user device. The user application may identify checkout fields on the online shopping site at block 608. For example, a web crawler may be utilized to search for checkout fields, which may be obtained from online shopping web pages, and may be accessed the web crawler and APIs. The web crawler may process merchant web pages, and identify and index fields on the merchant web pages. In an embodiment, a web crawler may be embodied in a script that may parse HTML code of the sites to look for certain checkout field attributes associated with merchant sites. If checkout fields are not identified, the processing may end at block 610.

At block 612, if checkout fields are identified, the customer may be authenticated by utilizing multi-factor authentication based on the pairing of the dynamic transaction card and the successful log in of the customer to the browser extension. This multi-factor authentication may provide computer access control in which the user is only granted access to complete the secure online checkout after successfully presenting these pieces of evidenced to an authentication system. For example, the customer may be authenticated based on evaluation of the connection between the dynamic transaction card and the user device, log in credentials of the customer for logging in to the browser extension associated with the electronic checkout page and user information stored in a digital security database. The customer may also be authenticated based on the log in credentials associated with logging in to the user application on the user device. The introduction of the user device and dynamic transaction card may provide immutable hardware identifiers, processors for encryption and location awareness, as well as new interactions via touch, microphone, camera, Bluetooth, BLE, and/or NFC, as the user device and dynamic transaction card are something customers have with them. The user device and dynamic transaction card may also enable transmission of data about customers and data indicative of things customers know. The digital security database may store information about a user that is enrolled in push notification authentication, including identifying characteristics of the dynamic transaction card, the user device and login information for the user for the browser extension associated with the checkout page. Thus, systems and methods for authentication described herein provide a novel digital authentication framework that utilizes digital authentication techniques enabled by user devices and dynamic transaction cards.

An application processor on the dynamic transaction card may be utilized to generate a unique key, which may include a token which may be utilized to securely store customer account information, which in turn may be utilized to authenticate the customer. As such, sensitive customer account information does not need to be entered to facilitate the funds transfer and may be obtained through the wireless connection. The unique key may be associated with the browser extension and may include a single-use transaction key.

If the authentication fails, the process may end at block 614. Upon authentication of a customer based on the evaluation of the connection between the dynamic transaction card and the user device, log in credentials of the user for logging in to the browser extension associated with the checkout page, and user information stored in the digital security delivery storage, the dynamic transaction card application may transmit customer account information to the customer application, via a Bluetooth or BLE network, at block 616, which at block 618, may prompt the browser extension to populate the fields on the electronic checkout page using the user account information transmitted by the dynamic transaction card to automatically facilitate payment to the merchant system. The customer account information may be passed and queued on the backend merchant system to complete the checkout transaction. The process may end at block 620.

In another embodiment, the dynamic transaction card may be placed in contact with the user device to establish a wireless connection. For example, the dynamic transaction card may include a front-end NFC chipset and a loop antenna, which may include a 13.56 MHz loop antenna. The dynamic transaction card application may transmit customer account information to the customer application, via a Bluetooth or BLE network, at block 616, which in response, may prompt the browser extension to populate the fields on the electronic checkout page using the user account information transmitted by the dynamic transaction card to automatically facilitate payment to the merchant system.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A system comprising:
a dynamic transaction card comprising:
a payment processing microprocessor; and
a secure payment chip storing financial data and a dynamic transaction card application, wherein the dynamic transaction card application, when executed, causes the payment processing microprocessor to:
receive, via a short-range wireless communication network, a connection attempt from a user device application executed on a user device;
create a short-range wireless connection between the dynamic transaction card and the user device; authenticate a user, the authentication being based on:
the connection between the dynamic transaction card and the user device;
log in credentials of the user from the user logging in to a browser extension associated with an electronic checkout page; and user information stored in a digital security delivery database; and
transmit an approval, via the short-range wireless connection, to the user device to complete a payment to a merchant system associated with the electronic checkout page, wherein the approval causes the user device application to:
identify fields within the electronic checkout page, the fields indicating a transaction is pending;
call, via an application programming interface (API) coupled to a communication interface that communicates with the dynamic transaction card and the user device via a network, an account provider system in response to identifying the fields,
receive a push notification from the account provider system, the push notification including user account information, and
populate the fields on the electronic checkout page using the user account information to complete the payment to the merchant system without user intervention;
wherein the digital security delivery database stores information indicating the user is enrolled in push notification authentication, including characteristics of the dynamic transaction card and the user device, and the log in credentials of the user for the browser extension associated with the electronic checkout page.

2. The system of claim 1, wherein the secure payment chip comprises a EuroPay-MasterCard-Visa (EMV).

3. The system of claim 1, wherein a web crawler identifies checkout fields on the electronic checkout page.

4. The system of claim 1, wherein the dynamic transaction card application generates a unique key associated with the browser extension.

5. The system of claim 4, wherein the unique key comprises a single-use transaction key.

6. The system of claim 4, wherein the account provider system evaluates the unique key to authenticate the user.

7. The system of claim 1, wherein the authentication of the user is based on log in credentials of the user wherein the user has logged in to the user application on the user device.

8. The system of claim 1, wherein the short range wireless communication network comprises a Bluetooth or Bluetooth Low Energy (BLE) network.

9. A method to automatically complete a payment in an electronic checkout page, the method comprising:
receiving, at a short-range wireless transceiver on a user device, a connection attempt from a dynamic transaction card;
creating, by the short-range wireless transceiver, a short-range wireless connection between the user device and the dynamic transaction card;
authenticating, by an application operating on the user device, a user of the user device, the authentication of the user being based on:
a successful connection between the dynamic transaction card and the user device;
log in credentials of the user received from the user logging in to a browser extension associated with the electronic checkout page; and
user information stored in a digital security delivery database;
receiving, via the short-range wireless transceiver, an approval from a dynamic transaction card application stored on a secure payment chip of the dynamic transaction card, the approval being based on the successful connection and the authentication of the user;
identifying, via the user device, fields within the electronic checkout page, the fields indicating a transaction is pending;
calling, via an application programming interface (API) coupled to a communication interface that communicates with the dynamic transaction card and the user device via a network, an account provider system in response to identifying the fields,
receiving, at the user device, a push notification from the account provider system, the push notification including user account information; and
populating the fields on the electronic checkout page using the user account information to complete the payment to the merchant system without user intervention;
wherein the digital security delivery database stores information indicating the user is enrolled in push notification authentication; and
wherein the information indicating the user is enrolled includes characteristics of dynamic transaction card and the user device, and the log in credentials for the user.

10. The method of claim 9, wherein a web crawler operating on the user device identifies the fields within the electronic checkout page.

11. The method of claim 9, wherein: the dynamic transaction card comprises a card application that generates a unique key associated with the browser extension; and the approval is further based on the unique key.

12. The method of claim 11, wherein the unique key comprises a single-use transaction key.

13. The method of claim 11, wherein the account provider system evaluates the unique key to authenticate the user.

14. The method of claim 9, wherein the log in credentials of the user are received at a user device application operating on the user device.

15. The method of claim 9, wherein the short-range wireless connection comprises a Bluetooth or Bluetooth Low Energy (BLE) connection.

* * * * *